(12) United States Patent
Wu et al.

(10) Patent No.: US 10,114,505 B2
(45) Date of Patent: Oct. 30, 2018

(54) TOUCH CONTROL DISPLAY PANEL AND TOUCH CONTROL DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Dengshan Wu, Xiamen (CN); Zhiwei Zheng, Xiamen (CN); Kangpeng Yang, Xiamen (CN); Yumin Xu, Xiamen (CN); Lingzhi Su, Xiamen (CN); Zhijie Wang, Xiamen (CN); Chaohuang Pan, Xiamen (CN); Shumao Wu, Xiamen (CN); Longsheng Zou, Xiamen (CN)

(73) Assignees: XIAMEN TIANMA MICRO-ELECTRONICS CO., LTD., Xiamen (CN); TIANMA MICROELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/380,630

(22) Filed: Dec. 15, 2016

(65) Prior Publication Data
US 2017/0097727 A1 Apr. 6, 2017

(30) Foreign Application Priority Data
Aug. 2, 2016 (CN) .......................... 2016 1 0622797

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04104* (2013.01)

(58) Field of Classification Search
CPC ...... G06F 3/0416; G06F 3/0412; G06F 3/044; G06F 2203/04104
See application file for complete search history.

(56) References Cited

U.S. PATENT DOCUMENTS

2002/0140654 A1* 10/2002 Kim .................... G02F 1/13452
345/87
2011/0128254 A1* 6/2011 Teranishi ................ G06F 3/044
345/174
(Continued)

FOREIGN PATENT DOCUMENTS

| CN | 101546243 A | 9/2009 |
|---|---|---|
| CN | 101561737 A | 10/2009 |

(Continued)

*Primary Examiner* — Lisa Landis
(74) *Attorney, Agent, or Firm* — Anova Law Group, PLLC

(57) ABSTRACT

A touch control display panel and a touch control display device are provided. The touch control display panel comprises a plurality of first and second touch control sensing electrodes; a plurality of first and second touch control sensing signal lines; and a first integrated circuit. The first integrated circuit has a longer distance to the first touch control sensing electrode than to the second touch control sensing electrode. R1 and R2 satisfy a predetermined relationship, such that touch control sensing signals respectively outputted by the first touch control sensing signal line and the second touch control sensing signal line exhibit substantially same signal delay time. R1 is a total resistance of the first touch control sensing electrode and the electrically connected first touch control sensing signal line, and R2 is a total resistance of the second touch control sensing electrode and the electrically connected second touch control sensing signal line.

19 Claims, 12 Drawing Sheets

(56) References Cited

U.S. PATENT DOCUMENTS

| 2015/0077370 | A1* | 3/2015 | Kim | G06F 3/0416 |
| | | | | 345/173 |
| 2017/0139522 | A1* | 5/2017 | Gong | G06F 3/0412 |
| 2017/0184895 | A1* | 6/2017 | Xu | G02F 1/13338 |

FOREIGN PATENT DOCUMENTS

| CN | 101882021 A | 11/2010 |
| CN | 102792252 A | 11/2012 |
| CN | 102844730 A | 12/2012 |
| CN | 104345984 A | 2/2015 |
| CN | 104375730 A | 2/2015 |
| CN | 104571768 A | 4/2015 |
| CN | 104850283 A | 8/2015 |
| CN | 204695283 U | 10/2015 |
| CN | 205193765 U | 4/2016 |
| CN | 205318347 U | 6/2016 |
| CN | 206039474 U | 3/2017 |

* cited by examiner

TOUCH CONTROL DISPLAY PANEL AND TOUCH CONTROL DISPLAY DEVICE

CROSS-REFERENCES TO RELATED APPLICATIONS

This application claims priority of Chinese Patent Application No. 201610622797.8, filed on Aug. 2, 2016, the entire contents of which are hereby incorporated by reference.

BACKGROUND

With the rapid development of display technology, touch control display technology has gradually spread to everyone's daily life. Current touch control display panels are often divided into several categories, such as resistance touch control display panels, capacitive touch control display panels, surface acoustic wave capacitive touch control display panels, and optical imaging capacitive touch control display panels, etc. Compared to a resistance touch control display panel, a capacitive touch control display panel exhibits advantage such as long lifetime, high transmittance, and multi-touch capability and, thus, has become a hot field of the touch control display technology.

The touch control detection principle of the capacitive touch display panel is explained as follows. Intersected touch control driving electrodes and touch control sensing electrodes are disposed in the touch control display panel, and a plurality of intersections are formed between the touch control driving electrodes and the touch control sensing electrodes. A capacitor array is formed in the intersections. A driving chip applies a touch control detecting signal to each touch control driving electrode, and sequentially detects a touch control sensing signal from the touch control sensing electrode corresponding to the touch control driving electrode. When a capacitance change is detected, a touch position is identified accordingly.

Because the touch control sensing electrodes are often disposed in different positions in the touch control display panel, each touch control sensing signal line may have a different length. Accordingly, a total resistance of each touch control sensing electrode plus the touch control sensing signal line electrically connected thereto may vary. Due to the various total resistance, when the touch control sensing electrode outputs a touch control sensing signal through the touch control sensing signal line electrically connected thereto, the touch control sensing signals outputted by different touch control sensing signal lines may exhibit different time delays. Thus, the uniformity of the touch control sensitivity across the touch control display panel may be poor.

The disclosed touch control display panel and touch control display device thereof directed to solve one or more problems set forth above and other problems.

BRIEF SUMMARY OF THE DISCLOSURE

One aspect of the present disclosure provides a touch control display panel. The touch control display panel comprises a plurality of touch control driving electrodes extending in a first direction and arranged in a second direction intersecting the first direction; a plurality of touch control sensing electrodes extending in the second direction and arranged in the first direction, and including a plurality of first touch control sensing electrodes and a plurality of second touch control sensing electrodes; a plurality of touch control sensing signal lines including a plurality of first touch control sensing signal lines and a plurality of second touch control sensing signal lines; and a first integrated circuit controlling the touch control display panel. A first touch control sensing electrode is electrically connected to the first integrated circuit through at least one first touch control sensing signal line. A second touch control sensing electrode is electrically connected to the first integrated circuit through at least one second touch control sensing signal line. A distance between the first touch control sensing electrode and the first integrated circuit is longer than a distance between the second touch control sensing electrode and the first integrated circuit. R1 and R2 satisfy a predetermined relationship, such that touch control sensing signals respectively outputted by the first touch control sensing signal line and the second touch control sensing signal line exhibit substantially same signal delay time. R1 is a total resistance of the first touch control sensing electrode and the first touch control sensing signal line electrically connected to the first touch control sensing electrode, and R2 is a total resistance of the second touch control sensing electrode and the second touch control sensing signal line electrically connected to the second touch control sensing electrode.

Another aspect of the present disclosure provides a touch control display device comprising a touch control display panel. The touch control display panel comprises a plurality of touch control driving electrodes extending in a first direction and arranged in a second direction intersecting the first direction; a plurality of touch control sensing electrodes extending in the second direction and arranged in the first direction, and including a plurality of first touch control sensing electrodes and a plurality of second touch control sensing electrodes; a plurality of touch control sensing signal lines including a plurality of first touch control sensing signal lines and a plurality of second touch control sensing signal lines; and a first integrated circuit controlling the touch control display panel. A first touch control sensing electrode is electrically connected to the first integrated circuit through at least one first touch control sensing signal line. A second touch control sensing electrode is electrically connected to the first integrated circuit through at least one second touch control sensing signal line. A distance between the first touch control sensing electrode and the first integrated circuit is longer than a distance between the second touch control sensing electrode and the first integrated circuit. R1 and R2 satisfy a predetermined relationship, such that touch control sensing signals respectively outputted by the first touch control sensing signal line and the second touch control sensing signal line exhibit substantially same signal delay time. R1 is a total resistance of the first touch control sensing electrode and the first touch control sensing signal line electrically connected to the first touch control sensing electrode, and R2 is a total resistance of the second touch control sensing electrode and the second touch control sensing signal line electrically connected to the second touch control sensing electrode.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

The present disclose provides an improve touch control display panel, which may comprise a plurality of touch control driving electrodes, a plurality of touch control sensing electrodes, and a first integrated circuit. The touch control driving electrodes may include a plurality of first touch control sensing electrodes and a plurality of second touch control sensing electrodes. A distance between the first touch control sensing electrode and the first integrated circuit may be longer than a distance between the second touch control sensing electrode and the first integrated circuit.

A total resistance of the first touch control sensing electrode and the first touch control sensing signal line electrically connected to the first touch control sensing electrode is R1, and a total resistance of the second touch control sensing electrode and the second touch control sensing signal line electrically connected to the second touch control sensing electrode is R2. R1 and R2 may satisfy a predetermined relationship, such that touch control sensing signals respectively outputted by each touch control sensing signal line may exhibit substantially same signal delay time.

Figure 1A:
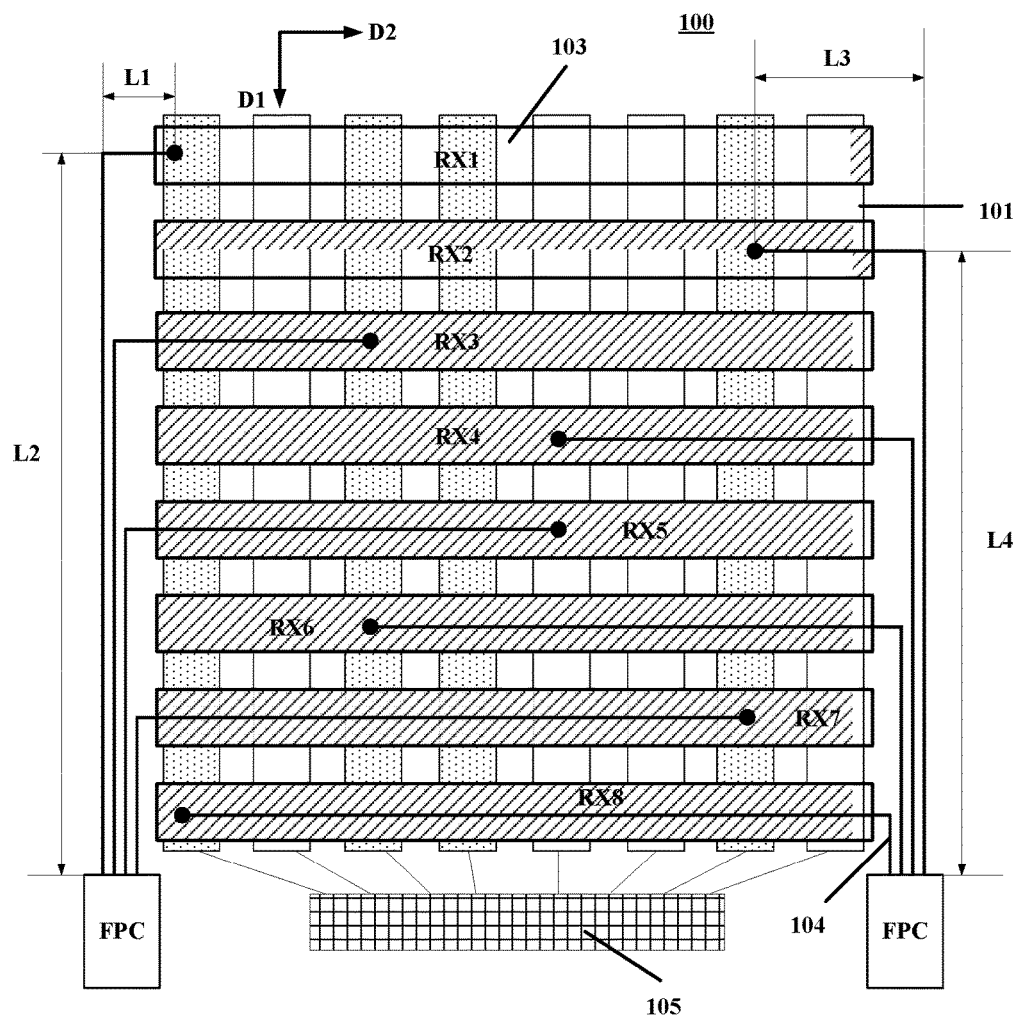
FIG. 1A illustrates a top view of an exemplary touch control display panel consistent with disclosed embodiments.

FIG. 1A illustrates a top view of an exemplary touch control display panel consistent with disclosed embodiments. As shown in FIG. 1A, the touch control display panel 100 may include a plurality of touch control driving electrodes 101, a plurality of touch control sensing electrodes 103, a plurality of touch control sensing signal lines 104, and a first integrated circuit 105. The first integrated circuit 105 may be any appropriate display controlling circuits and/or touch scanning circuits and/or touch sensing circuits of the touch control display panel.

The touch control display panel 100 may be a liquid crystal display (LCD) panel, an organic light-emitting diode (OLED) display panel, a plasma display panel (PDP), a field emission display (FED) panel, a light-emitting diode (LED) display panel, a quantum dots (QDs) display panel, an electrophoretic display panel or other appropriate display panel capable of displaying videos and/or images.

In the touch control display panel 100, the touch control driving electrodes 101 may be extending in a first direction D1 and arranged in a second direction D2. The first direction D1 may intersect the second direction D2. As shown in FIG. 1A, the touch control display panel 100 may include a plurality of touch control sensing electrodes 103, such as a touch control sensing electrode RX1, and a touch control sensing electrode RX2, etc. The touch control sensing electrodes 103 may be extending in the second direction D2 and arranged in the first direction D1.

The touch control driving electrode 101 and the touch control sensing electrode 103 may have different shapes according to various application scenarios. In one embodiment, as shown in FIG. 1A, the touch control driving electrode 101 and the touch control sensing electrode 103 may be a stripe-shaped electrode, respectively. That is, the stripe-shaped touch control driving electrodes 101 may be extending in the first direction D1 and arranged in the second direction D2. Meanwhile, the stripe-shaped touch control sensing electrodes 103 may be extending in the second direction D2 and arranged in the first direction D1.

In another embedment, the touch control driving electrode 101 and touch control sensing electrode 103 may be different from the stripe-shaped electrode, for example, the touch control driving electrode 101 and/or touch control sensing electrode 103 may be a zip-zag electrode, and a wave-shaped electrode, etc. The numbers and the shape of the touch control electrodes in FIG. 1A are for illustrative purposes, and are not intended to limit the scope of the present disclosure.

The first integrated circuit 105 may include a driving chip, and each touch control sensing electrode 103 may be electrically connected to the first integrated circuit 105 through a corresponding touch control sensing signal line 104. The plurality of touch control sensing electrodes 103 may include a plurality of first touch control sensing electrodes and a plurality of second touch control sensing electrodes. The touch control sensing signal lines 104 may include a plurality of first touch control sensing signal lines and a plurality of second touch control sensing signal lines.

In particular, the first touch control sensing electrode may be electrically connected to the first integrated circuit 105 through a corresponding first touch control sensing signal line. The second touch control sensing electrode may be electrically connected to the first integrated circuit 105 through a corresponding second touch control sensing signal line. A distance from the first touch control sensing electrode to the first integrated circuit 105 may be larger than a distance from the second touch control sensing electrode to the first integrated circuit 105.

For example, as shown in FIG. 1A, a distance from the touch control sensing electrode RX1 to the first integrated circuit 105 may be larger than a distance from the touch control sensing electrode RX2 to the first integrated circuit 105, in which the touch control sensing electrode RX1 may be referred as the first touch control sensing electrode, while the touch control sensing electrode RX2 may be referred as the second touch control sensing electrode. On the other hand, a distance from the touch control sensing electrode RX2 to the first integrated circuit 105 may be larger than a distance from the touch control sensing electrode RX3 to the first integrated circuit 105, in which the touch control sensing electrode RX3 may be referred as the first touch control sensing electrode, while the touch control sensing electrode RX3 may be referred as the second touch control sensing electrode.

It should be note that, the first touch control sensing electrode and the second touch control sensing electrode may not refer to a specific touch control sensing electrode or specific touch control sensing electrodes. Instead, the first touch control sensing electrode and the second touch control sensing electrode may be a relative concept. For example, for two touch control sensing electrodes, according to their different distance to the first integrated circuit 105, one of the two touch control sensing electrodes may be considered as the first touch control sensing electrode, and the other may be considered as the second touch control sensing electrode.

In the disclosed embodiments, each touch control sensing electrode 103 and each touch control sensing signal line 104 may have a certain resistance, respectively. Assuming that a total resistance of the first touch control sensing electrode and the corresponding first touch control sensing signal line electrically connect to the first touch control sensing electrode is R1, and a total resistance of the second touch control sensing electrode and the corresponding second touch control sensing signal line electrically connect to the second touch control sensing electrode is R2.

In the disclosed embodiments, the resistance R1 and R2 may be configured to satisfy a predetermined relationship, such that a total resistance of each touch control sensing electrode and its electrically connected touch control sensing signal line may be equal or substantially equal. The touch control sensing signals respectively outputted by the first touch control sensing signal line and the second touch control sensing signal line exhibit substantially same signal delay time. Accordingly, the uniformity of the touch control sensitivity across the touch control display panel may be improved.

In one embodiment, the resistance R1 and R2 may be configured to satisfy a predetermined relationship of $-20\% \leq (R1-R2)/R2 \leq 20\%$, such that the detected touch control sensing signals respectively outputted by the first touch control sensing signal line and the second touch control sensing signal line may substantially exhibit the same signal delay time. That is, in the touch control display panel 100, when the total resistance of each touch control sensing electrode 103 and the corresponding touch control sensing line 104 electrically connected to the touch control sensing electrode 103 is equal or substantially equal, the uniformity of the touch control sensitivity across the touch control display panel 100 may be improved.

In certain embodiments, the resistance R1 may be equal to R2. That is, the total resistance R1 of the first touch control sensing electrode and the first touch control sensing signal line electrically connected to the first touch control sensing electrode, may be equal to, the total resistance R2 of the second touch control sensing electrode and the second touch control sensing signal line electrically connected to the second touch control sensing electrode. Accordingly, in the touch control display panel 100, the total resistance of each touch control sensing electrode 103 and the corresponding touch control sensing line 104 electrically connected to the touch control sensing electrode 103 may be the same. Thus, each touch detection point on the touch control display panel 100 may exhibit the same touch control sensitivity.

Further, the resistance of each touch control sensing electrode 103 and/or the resistance of each touch control sensing line 104 may be changed through various approaches, such that R1 and R2 may be configured to satisfy the condition of $-20\% \leq (R1-R2)/R2 \leq 20\%$. Accordingly, in the touch control display panel 100, when the first touch control sensing electrode and the second touch control sensing electrode respectively send touch control sensing signals to the first integrated circuit 105, the signal delay time may be substantially equal. Thus, the uniformity of the touch control sensitivity across the touch control display panel 100 may be improved.

As shown in FIG. 1A, in the touch control display panel 100, given an equal resistance of each touch control sensing electrode 103, when the first touch control sensing line electrically connected to the first touch control sensing electrode and the second touch control sensing line electrically connected to the second touch control sensing electrode have a same line width and a same length or have a same line width and a same length within the permissible range of error, the first touch control sensing line and the second touch control sensing line may exhibit a same resistance or exhibit a same resistance within the permissible range of error.

Thus, in the touch control display panel 100, when the first touch control sensing electrode and the second touch control sensing electrode have a same resistance and, meanwhile, the first touch control sensing line and the second touch control sensing line exhibit a same resistance or exhibit a same resistance within the permissible range of error, R1 and R2 may satisfy the condition of $-20\% \leq (R1-R2)/R2 \leq 20\%$.

Further, in the touch control display panel 100, an insulating layer may be disposed between the touch control sensing electrodes 103 and the touch control sensing signal lines 104. A plurality of through-holes may be disposed in the insulating layer, as denoted by the black dots in FIG. 1A. Each through-hole may correspond to one touch control sensing electrode 103, and each touch control sensing electrode 103 may be electrically connected to the touch control sensing signal line 104 through the corresponding through-hole.

In one embodiment, when the first touch control sensing signal line has a longer length in the first direction D1 than the second touch control sensing signal line, through configuring the first touch control sensing signal line to have a shorter length in the second direction D2 than the second touch control sensing signal line, the first touch control sensing signal line and the second touch control sensing signal line may sustainably have a same length. Thus, the uniformity of the touch control sensitivity across the touch control display panel 100 may be improved. An example is illustrated in FIG. 1A.

As shown in FIG. 1A, the first touch control sensing electrode may be referred as the touch control sensing electrode RX1 and the second touch control sensing electrode may be referred as the touch control sensing electrode RX2. The touch control sensing signal line 104 electrically connected to the touch control sensing electrode RX1 may include a first portion extending in the first direction D1 and a second portion extending in the second direction D2, whose length is L2 and L1, respectively. That is, the touch control sensing signal line 104 electrically connected to the touch control sensing electrode RX1 may be a fold line including a plurality of segments, and the plurality of segments may not belong to same straight line.

Similarly, the touch control sensing signal line 104 electrically connected to the touch control sensing electrode RX2 may include a first portion extending in the first direction D1 and a second portion extending in the second direction D2, whose length is L4 and L3, respectively. That is, the touch control sensing signal line 104 electrically connected to the touch control sensing electrode RX2 may also be a fold line including a plurality of segments.

In particular, L2 may be longer than L4. Thus, through configuring L1 to be shorter than L3 by designing the positions of the through-holes, L1, L2, L3, and L4 may be configured to substantially satisfy L1+L2=L3+L4. Accordingly, the touch control sensitivity across touch control display panel 100 may substantially be uniform.

Further, as shown in FIG. 1A, the projection of the touch control sensing signal line 104 onto the touch control sensing electrode 103 may be a straight line. That is, when being projected onto the touch control sensing electrode 103, extending in the second direction D2, the portion of the touch control sensing signal line 104 may have projection of a straight line.

In certain embodiments, the projection of the touch control sensing signal line 104 onto the touch control sensing electrode 103 may be a fold line or a curve. That is, when being projected onto the touch control sensing electrode 103, extending in the second direction D2, the portion of the touch control sensing signal line 104 may have projection of a fold line or a curve.

For example, in the second touch control sensing signal line, the second portion extending in the second direction D2 is a straight line and, thus, the condition that the length of the second touch control sensing signal line is equal to the length of the first touch control sensing signal line may not satisfied. However, the first portion of the second touch control electrode may be configured to be a fold line or a curve, such that the length of the first portion of the second touch control sensing signal line may be increased. Then the length of the second touch control sensing signal line may substantially be equal to the length of the first touch control sensing signal line. The corresponding structure is illustrated in FIG. 1B.

Figure 1B:
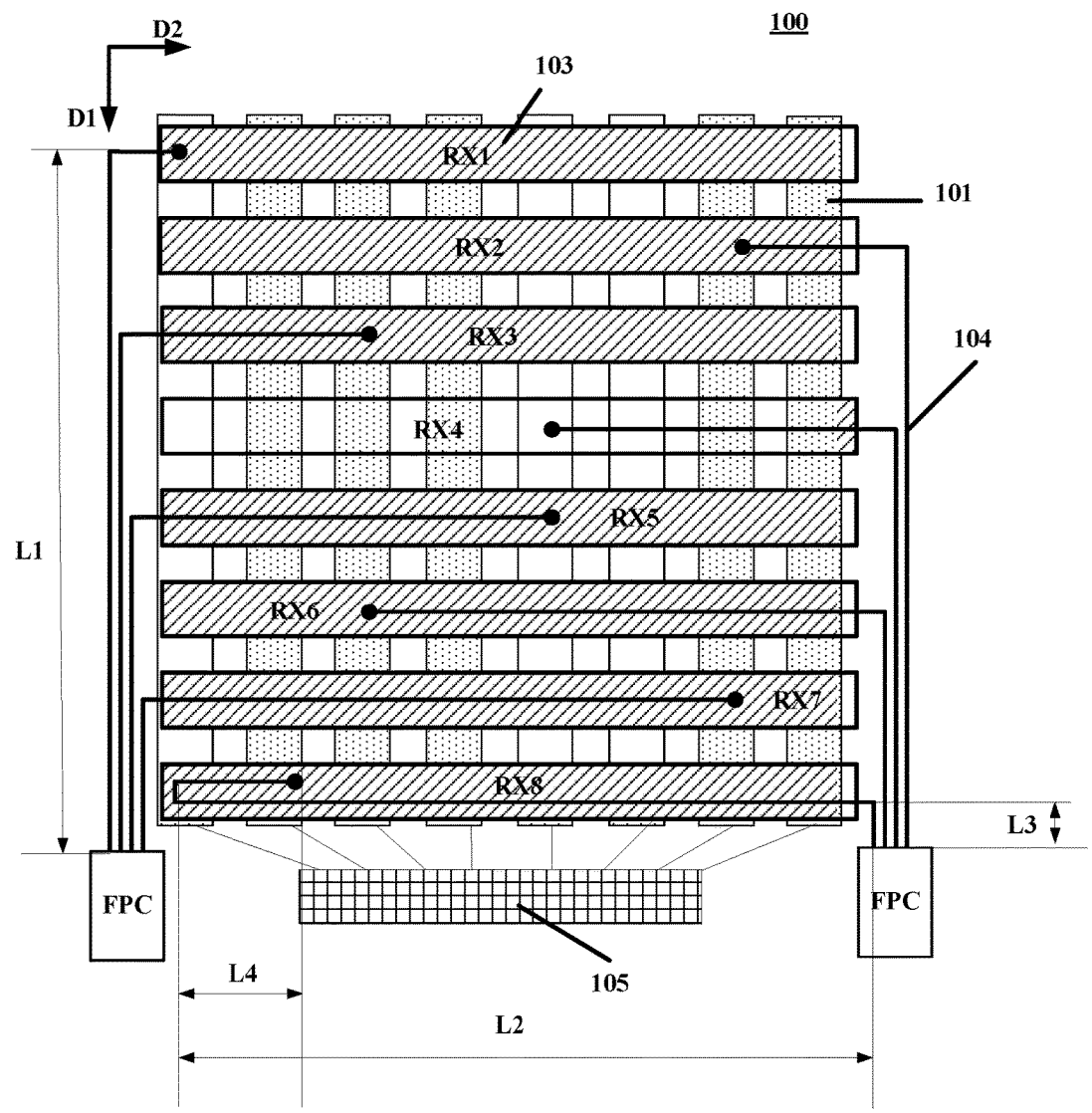
FIG. 1B illustrates a top view of another exemplary touch control display panel consistent with disclosed embodiments.

FIG. 1B illustrates a top view of another exemplary touch control display panel consistent with disclosed embodiments. The similarities between FIG. 1A and FIG. 1B are not repeated here, while certain differences may be explained.

As shown in FIG. 1B, the first touch control sensing electrode may be referred as the touch control sensing electrode RX1 (called as RX1 in the following description), and the second touch control sensing electrode may be referred as the touch control sensing electrode RX8 (called as RX8 in the following description). The touch control sensing signal line 104 electrically connected to RX1 may have a length of L1. The touch control sensing signal line 104 electrically connected to RX8 may include a first portion extending in the first direction D1 and a second portion extending in the second direction D2, whose length is L3 and (L2+L4) respectively.

If the second portion is a straight line, i.e., if the second portion only includes the segment of L2, the length of the touch control sensing signal line 104 electrically connected to RX8 may not be configured to be the same as the length of the touch control sensing signal line 104 electrically connected to RX1 through specifically designing the positions of the through-hole. That is, L2+L3≠L1. In particular, (L2+L3) may be smaller than L1, i.e., L2+L3<L1.

To solve the problem set forth above, as shown in FIG. 1B, when being projected onto RX8, the projection of the touch control sensing signal line 104 electrically connected to RX8 may be configured to be a fold line. That is, when being projected onto RX8, the projection of the second portion of the touch control sensing signal line 104 electrically connected to RX8 may be configured to be a fold line, for example, including the segment L3 and the segment L4. Thus, the length of the touch control sensing signal line 104 electrically connected to RX8 may be configured to be the same or substantially the same as the length of the touch control sensing signal line 104 electrically connected to RX1. That is, L2+L3+L4=L1.

According to the above discussion, the disclosed touch control display panel 100 may include a plurality of first touch control sensing electrodes and a plurality of second touch control sensing electrodes. The distance between the first touch control sensing electrode and the first integrated circuit 105 may be greater than the distance between the second touch control sensing electrode and first integrated circuit 105.

Through configuring the length of the first touch control sensing signal line electrically connected to the first touch control sensing electrode to be the same or substantially the same as the length of the second touch control sensing signal line electrically connected to the second touch control sensing electrode, R1 may be equal to R2, or R1 may be equal to R2 within the permissible range of error. R1 is the total resistance of one first touch control sensing electrode and the first touch control sensing signal line electrically connect to the first touch control sensing electrode, and R2 is the total resistance of one second touch control sensing electrode and the second touch control sensing signal line electrically connect to the second touch control sensing electrode.

Thus, the total resistance of each touch control sensing electrode 103 and the touch control sensing signal line 104 electrically connected to the touch control sensing electrode 103 may substantially be the same. Accordingly, the uniformity of the touch control sensitivity across the touch control display panel 100 may be improved.

Figure 2:
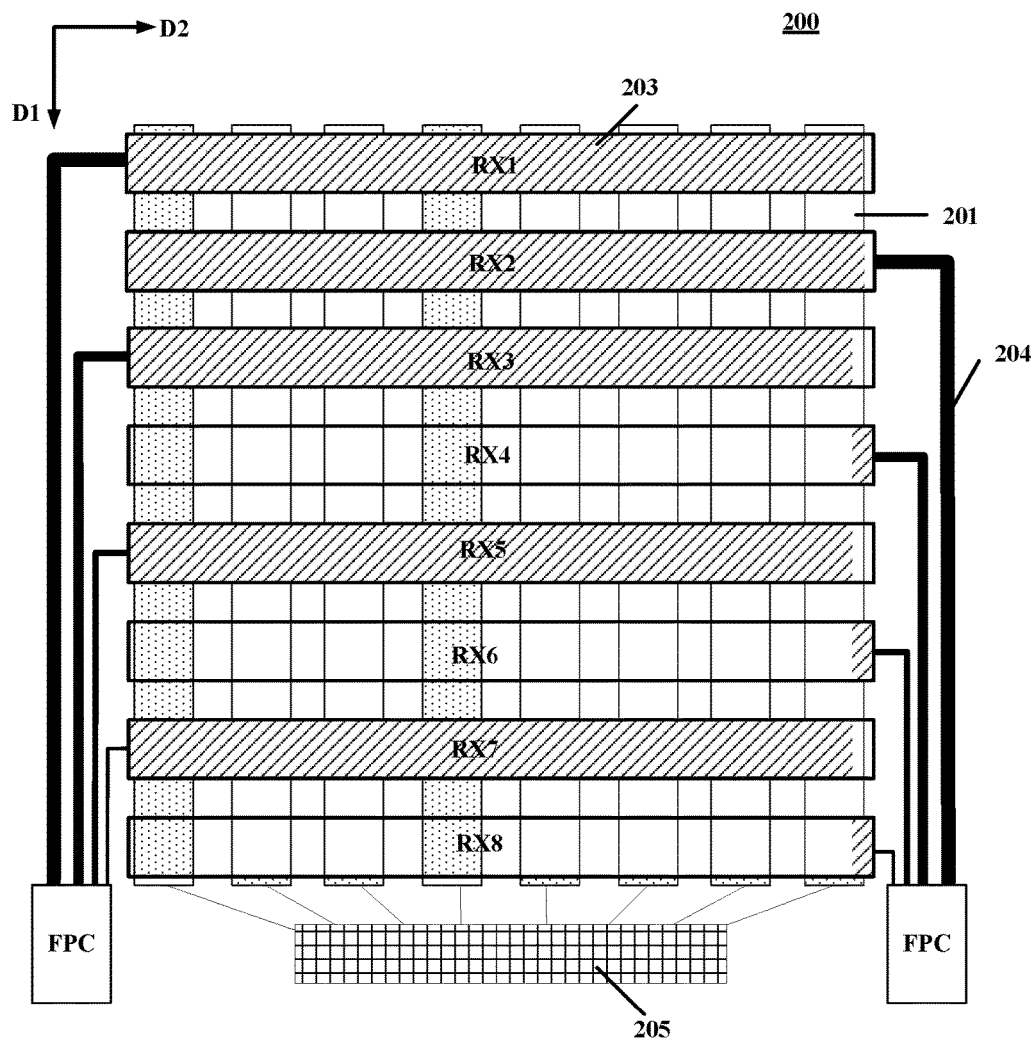
FIG. 2 illustrates a top view of another exemplary touch control display panel consistent with disclosed embodiments.

FIG. 2 illustrates a top view of another exemplary touch control display panel consistent with disclosed embodiments. The similarities between FIG. 1A and FIG. 2 are not repeated here, while certain differences may be explained.

As shown in FIG. 2, the touch control display panel 200 may include a plurality of touch control driving electrodes 201, a plurality of touch control sensing electrodes 203, a plurality of touch control sensing signal lines 204, and a first integrated circuit 205. The plurality of touch control sensing electrodes 203 may include a plurality of first touch control sensing electrodes and a plurality of second touch control sensing electrodes. Each touch control sensing electrode 203 may be configured to have a same area and a same length in the first direction D1, such that the first touch control sensing electrode and the second touch control sensing electrode may substantially have a same resistance.

Provided that the first touch control sensing electrode and the second touch control sensing electrode have the same resistance, when the first touch control sensing signal line electrically connected to the first touch control sensing electrode has a same resistance as the second touch control sensing signal line electrically connected to the second touch control sensing electrode, the total resistance of each touch control sensing electrode and the touch control sensing signal line electrically connected to the touch control sensing electrode may substantially the same.

That is, in the touch control display panel 200, the resistance R1 may substantially be equal to the resistance R2, where R1 is the total resistance of the first touch control sensing electrode and the first touch control sensing signal line electrically connected to the first touch control sensing electrode, and R2 is the total resistance of the second touch control sensing electrode and the second touch control sensing signal line electrically connected to the second touch control sensing electrode. Accordingly, the touch detection points in the touch control display panel 200 may exhibit a more uniform touch control sensitivity.

To achieve the goal set forth above, in one embodiment, as shown in FIG. 2, the first touch control sensing signal line may be configured to have a longer length and a larger line width than the second touch control sensing signal line and, meanwhile, the first touch control sensing signal line may be configured to have a same length-to-line width ratio as the second touch control sensing signal line. Thus, the resistance of the first touch control sensing signal line may be equal to the resistance of the second touch control sensing signal line.

Because according to the resistance equation, the resistance of the touch control sensing signal line 204 are related to the conductivity, the length and the cross-sectional area of the of the touch control sensing signal line 204. The touch control sensing signal lines 204 in the touch control display panel 200 are often obtained through etching a same metal layer, such that each touch control sensing signal line 204 in the same touch control display panel may have a same conductivity and a same metal layer thickness. That is, the cross-sectional area of the of the touch control sensing signal line 204 may be only related to the line width of the touch control sensing signal line 204.

Thus, the resistance of each touch control sensing signal line 204 may be determined by the length-to-line width ratio of the touch control sensing signal line 204. When the first touch control sensing signal line has a same length-to-line width ratio as the second touch control sensing signal line, R1 may be equal to R2. Accordingly, each touch detection point in the touch control display panel 200 may exhibit a same uniform touch control sensitivity. The corresponding structure may be explained by FIG. 2.

As shown in FIG. 2, in one embodiment, the first touch control sensing electrode and the second touch control sensing electrode may be referred as the touch control sensing electrode RX1 (called as RX1 in the following description) and the touch control sensing electrode RX2 (called as RX2 in the following description), respectively. Accordingly, the first touch control sensing signal line may be referred as the touch control sensing signal line electrically connected to RX1, and the second touch control sensing signal line may be referred as the touch control sensing signal line electrically connected to RX2.

In particular, the touch control sensing signal line electrically connected to RX1 may have a length of L1, and the touch control sensing signal line electrically connected to RX2 may have a length of L2. A ratio between the length of the touch control sensing signal line electrically connected to RX1 and the length of the touch control sensing signal line electrically connected to RX2 may be L1:L2.

The touch control sensing signal line electrically connected to RX1 may be longer than the touch control sensing signal line electrically connected to RX2. Meanwhile, the touch control sensing signal line electrically connected to RX1 may have a larger line width than the touch control sensing signal line electrically connected to RX2. In particular, a ratio between the line width of the touch control sensing signal line electrically connected to RX1 and the line width of the touch control sensing signal line electrically connected to RX2 may also be L1:L2. Thus, the touch control sensing signal line electrically connected to RX1 has a same length-to-line width ratio as the touch control sensing signal line electrically connected to RX2.

When the touch control sensing signal line electrically connected to RX1 has a same length-to-line width ratio as the touch control sensing signal line electrically connected to RX2, the touch control sensing signal line electrically connected to RX1 may exhibit a same resistance as the touch control sensing signal line electrically connected to RX2. Accordingly, each touch detection point in the touch control display panel 200 may exhibit a same touch control sensitivity.

As shown in FIG. 2, in the touch control display panel 200, in the first direction D1, as the distance from each touch control sensing electrode 203 to the first integrated circuit 205 decreases, the length of the touch control sensing signal line electrically connected to the corresponding touch control sensing electrode may gradually decrease. Meanwhile, the line width of the touch control sensing signal line electrically connected to the corresponding touch control sensing electrode may also gradually decrease. However, because each touch control sensing signal line may have a same length-to-line width ratio, each touch control sensing signal line may still have a same resistance. Accordingly, each touch detection point in the touch control display panel 200 may still exhibit a same touch control sensitivity.

For example, the touch control sensing signal line electrically connected to RX1 may have a length of L1, and the touch control sensing signal line electrically connected to RX2 may have a length of L2, the touch control sensing signal line electrically connected to RX3 may have a length of L3, . . . , and the touch control sensing signal line electrically connected to RXn may have a length of Ln, where L1>L2>L3 . . . >Ln. A ratio among the length of the touch control sensing signal line electrically connected to RX1, the length of the touch control sensing signal line electrically connected to RX2, the length of the touch control sensing signal line electrically connected to RX3, . . . , and the length of the touch control sensing signal line electrically connected to RXn may be L1:L2:L3 . . . :Ln.

Meanwhile, a ratio among the line width of the touch control sensing signal line electrically connected to RX1, the line width of the touch control sensing signal line electrically connected to RX2, the line width of the touch control sensing signal line electrically connected to RX3, . . . , and the line width of the touch control sensing signal line electrically connected to RXn may also be L1:L2:L3 . . . :Ln. That is, each touch control sensing signal line may have a same length-to-line width ratio. Thus, each touch control sensing signal line may have a same resistance and, accordingly, each touch detection point in the touch control display panel 200 may still exhibit a same touch control sensitivity.

In the touch control display panel 200, through varying the length and/or line width of the touch control sensing signal line, R1 and R2 may be configured to satisfy a relationship of $-20\% \leq (R1-R2)/R2 \leq 20\%$, where R1 is a total resistance of the first touch control sensing electrode and the first touch control sensing signal line electrically connected to the first touch control sensing electrode, and R2 is a total resistance of the second touch control sensing electrode and the second touch control sensing signal line electrically connected to the first touch control sensing electrode. Thus, the difference in the signal delay times of the touch control sensing signals sent by the corresponding touch control sensing electrodes 203 may be significantly reduced. Any embodiments in which R1 and R2 satisfy the condition of $-20\% \leq (R1-R2)/R2 \leq 20\%$ are within the scope of the present disclosure.

In the disclosed embodiments, provided that each touch control sensing signal line has a different length, each touch control sensing signal line may be configured to have a different line width, such that the resistance of each touch control sensing signal line may substantially be the same. Thus, R1 and R2 may satisfy the relationship of $-20\% \leq (R1-R2)/R2 \leq 20\%$, where R1 is a total resistance of the first touch control sensing electrode and the first touch control sensing signal line electrically connected to the first touch control sensing electrode, and R2 is a total resistance of the second touch control sensing electrode and the second touch control sensing signal line electrically connected to the second touch control sensing electrode.

Figure 7:
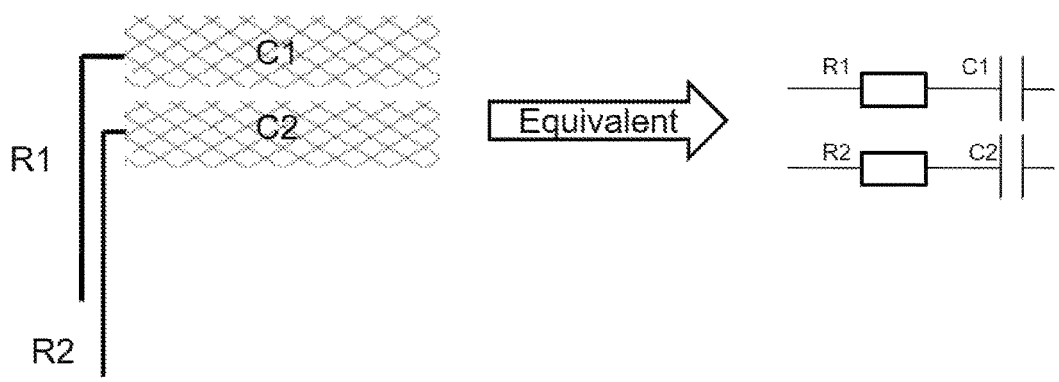
FIG. 7 illustrates an equivalent circuit diagram of an exemplary first touch control sensing electrode and an exemplary first touch control sensing signal line electrically connected to the first touch control sensing electrode and an exemplary second touch control sensing electrode and an exemplary second touch control sensing signal line electrically connected to the second touch control sensing electrode consistent with disclosed embodiments.

Because the touch control sensing electrode 203 and the touch control driving electrode 201 function as two plates of the capacitor formed between the touch control sensing electrode 203 and the touch control driving electrode 201, the first touch control sensing electrode and the first touch control sensing signal line electrically connected to the first touch control sensing electrode, and the shown in FIG. 7.

As shown in FIG. 7, R1 is the total resistance of the first touch control sensing electrode RX1 and the first touch control sensing signal line electrically connected to the first touch control sensing electrode RX1, and R2 is the total resistance of the second touch control sensing electrode RX2 and the second touch control sensing signal line electrically connected to the second touch control sensing electrode RX2. C1 is the capacitance at the first touch control sensing electrode RX1, and C2 is the capacitance at the second touch control sensing electrode RX2.

Referring to FIG. 2 and FIG. 7, as discussed in FIG. 2, when each touch control sensing signal line 204 has a different length, each touch control sensing signal line 204 may be configured to have a different line width. Thus, each touch control sensing signal line 204 may have a same length-to-line width ratio which, in turn, may lead to a same resistance. Because each touch control sensing electrode 203 has a same area, the corresponding capacitor may have a same plate area. Thus, R1*C1 may substantially be the same as R2*C2. Similarly, each touch detection point in the touch control display panel 200 may exhibit a same R*C.

In particular, the value of R*C may be reduced when the line width of the touch control sensing signal line 204 increases. A substantially small R*C may be highly desired to lower the power consumption and enhance the performance of the touch control display panel 200. However, the line width of the touch control sensing signal line 204 electrically connected to the touch control sensing electrode 203 may be limited by the border of the touch control display panel 200. That is, due to the limited border of the touch control display panel 200, the value of R*C may be difficult to be further reduced.

Figure 3A:
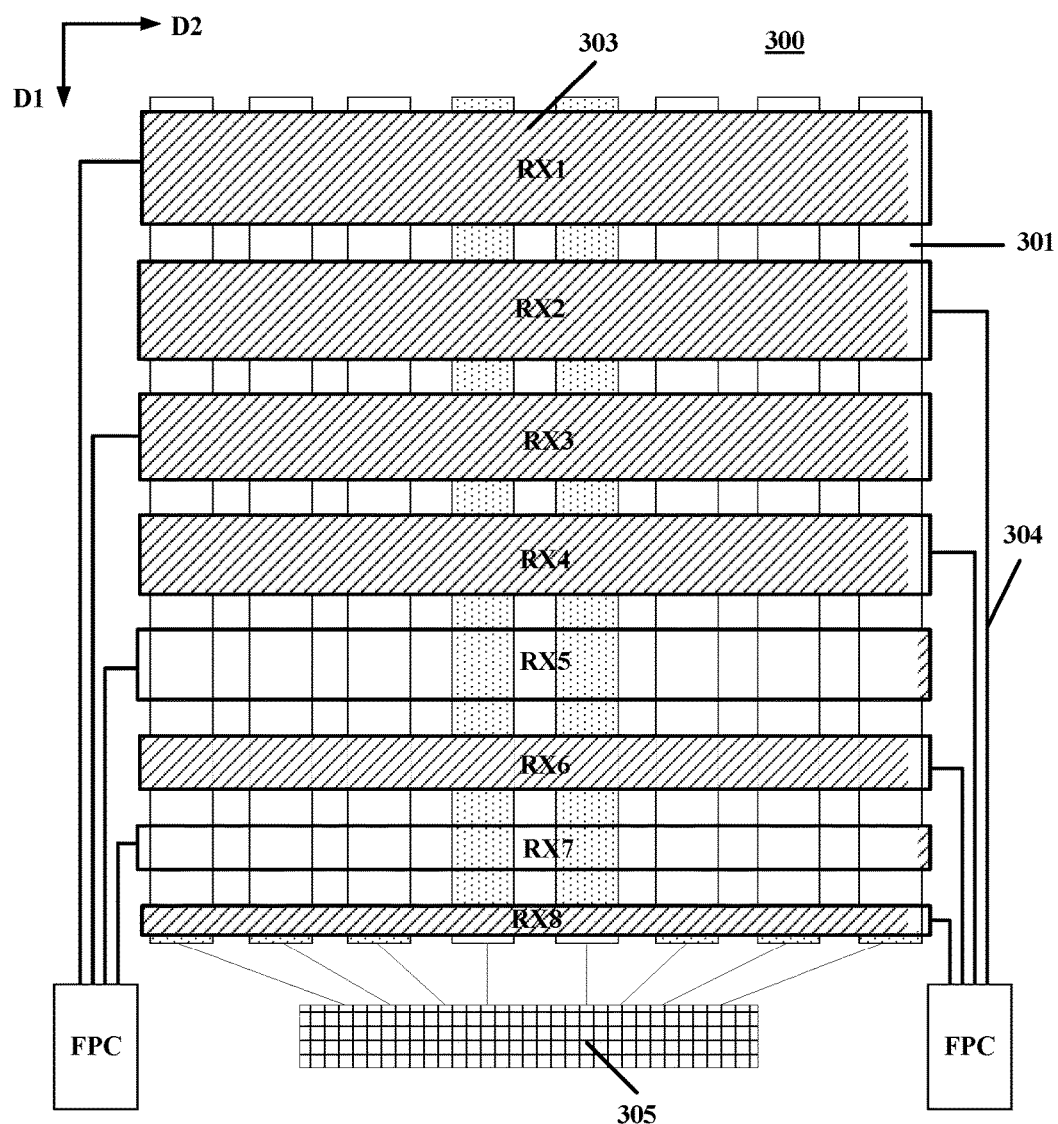
FIG. 3A illustrates a top view of another exemplary touch control display panel consistent with disclosed embodiments.

To solve the problem set forth above, FIG. 3A illustrates a top view of another exemplary touch control display panel consistent with disclosed embodiments, in which each touch control sensing line may have a same line width. On one hand, each touch detection point in the touch control display panel may still exhibit a same touch control sensitivity. On the other hand, the touch control sensing line may have a sustainably narrow width, such that the touch control display panel may be able to have a sustainably narrow border, saving precious space when the touch control display panel is implemented into certain compact devices.

The similarities between FIG. 1A and FIG. 3A are not repeated here, while certain differences may be explained. As shown in FIG. 3A, the touch control display panel 300 may include a plurality of touch control driving electrodes 301, a plurality of touch control sensing electrodes 303, a plurality of touch control sensing signal lines 304, and a first integrated circuit 305. The touch control sensing electrodes 303 may include a plurality of first touch control sensing electrodes and a plurality of second touch control sensing electrodes. The distance between the first touch control sensing electrode and the first integrated circuit 305 may be longer than the distance between the second touch control sensing electrode and the first integrated circuit 305. Each touch control sensing electrode 303 may have a different orthogonal projection area on the plane formed by the intersected first direction D1 and second direction D2.

In one embodiment, as shown in FIG. 3A, when the distance from the touch control sensing electrode 303 to the first integrated circuit 305 gradually decreases in the first direction D1, the area of each touch control sensing electrode 303 may gradually decrease, or the length of each touch control sensing electrode 303 may gradually decrease in the first direction D1. Thus, the resistance of each touch control sensing electrode 303 arranged in the first direction D1 may gradually increase. That is, in the touch control display panel 300, the first touch control sensing electrode may have a smaller resistance than the second touch control sensing electrode.

On the other hand, when the distance from the touch control sensing electrode 303 to the first integrated circuit 305 gradually decreases in the first direction D1, the length of the touch control sensing signal line 304 electrically connected to the corresponding touch control sensing electrode 303 may gradually decrease in the first direction D1. Provided that the line width of each touch control sensing signal line 304 is the same, the resistance of each touch control sensing signal line 304 arranged in the first direction D1 may gradually decrease. That is, the first touch control sensing signal line may have a larger resistance than the second touch control sensing signal line.

Thus, when the resistance difference between the first touch control sensing electrode and the second touch control sensing electrode is equal to the resistance difference between the second touch control sensing signal line and the first touch control sensing signal line, R1 may be equal to R2, where R1 is the total resistance of the first touch control sensing electrode and the first touch control sensing signal line electrically connected thereto, and R2 is the total resistance of the second touch control sensing electrode and the second touch control sensing signal line electrically connected thereto.

That is, when $R_{first\ touch\ control\ sensing\ electrode} - R_{second\ touch\ control\ sensing\ electrode} = R_{second\ touch\ control\ sensing\ signal\ line} - R_{first\ touch\ control\ sensing\ signal\ line}$, R1 may be equal to R2. Accordingly, the touch detection points on the touch control display panel 300 may substantially exhibit a uniform touch control sensitivity.

In the touch control display panel 300, through varying the area of the touch control sensing electrode or the length in the direction D1 of the touch control sensing electrode vary, R1 and R2 may be configured to satisfy the condition of $-20\% \leq (R1-R2)/R2 \leq 20\%$, where R1 is the total resistance of the first touch control sensing electrode and the first touch control sensing signal line electrically connected thereto, and R2 is the total resistance of the second touch control sensing electrode and the second touch control sensing signal line electrically connected thereto.

Thus, the difference in the signal delay times of the touch control sensing signals sent by the touch control sensing electrodes 303 may be significantly reduced, and the uniformity of the touch sensitively across the touch control display panel 300 may be significantly improved. Any embodiments in which R1 and R2 satisfy the condition of $-20\% \leq (R1-R2)/R2 \leq 20\%$ are within the scope of the present disclosure.

Figure 3B:
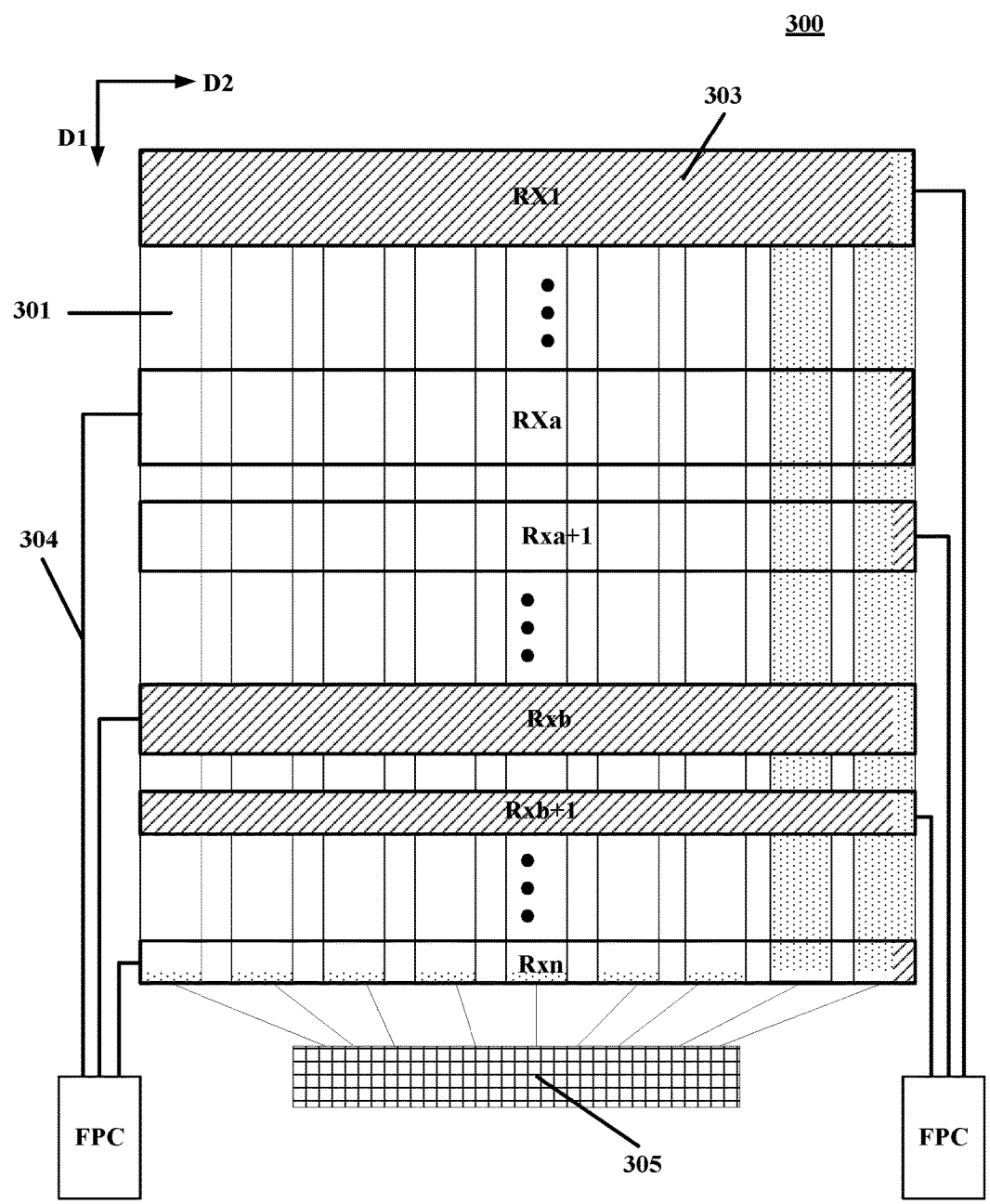
FIG. 3B illustrates a top view of another exemplary touch control display panel consistent with disclosed embodiments.

FIG. 3B illustrates a top view of another exemplary touch control display panel consistent with disclosed embodiments. The similarities between FIG. 3A and FIG. 3B are not repeated here, while certain differences may be explained below.

As shown in FIG. 3B, the touch control display panel 300 may include n number of touch control sensing electrodes 303, such as touch control sensing electrode RX1, a touch control sensing electrode RXa, and a touch control sensing electrode RXb, etc., where a, b, n are positive integers, respectively. In particular, when the distance between each touch control sensing electrode 303 and the first integrated circuit 305 gradually decreases, the n number of touch control sensing electrodes 303 may be divided into a plurality of touch control sensing electrode groups, and the touch control sensing electrodes 303 in the same touch control sensing electrode group may have a same area and a same resistance.

In particular, when the distance between each touch control sensing electrode group and the first integrated circuit 305 gradually increases, the area of each touch control sensing electrodes in the touch control sensing electrode groups may gradually increases, while the resistance of each touch control sensing electrodes in the touch control sensing electrode group may gradually decrease. That is, the touch control sensing electrodes in the touch control sensing electrode group far away from the first integrated circuit 305 may have a larger area but smaller resistance than the touch control sensing electrodes in the touch control sensing electrode group close to from the first integrated circuit 305

Thus, the total resistance of each touch control sensing electrode 303 and the touch control sensing electrode signal line 304 electrically connected thereto may be the same within the permissible range of error. Accordingly, R1 and R2 may be configured to satisfy the condition of $-20\% \leq (R1-R2)/R2 \leq 20\%$, where R1 is the total resistance of the first touch control sensing electrode and the first touch control sensing signal line electrically connected thereto, and R2 is the total resistance of the second touch control sensing electrode and the second touch control sensing signal line electrically connected thereto. The corresponding structure may be explained by FIG. 3B.

In one embodiment, as shown in FIG. 3B, the touch control sensing electrode RX1 to the touch control sensing electrode RXa may form a first touch control sensing electrode group, the touch control sensing electrode RXa+1 to the touch control sensing electrode RXb may form a second touch control sensing electrode group, and the touch control sensing electrode RXb+1 to the touch control sensing electrode RXn may form a third touch control sensing electrode group.

The area of each touch control sensing electrode may be determined by the length and the width of the touch control sensing electrode. In particular, the width of the touch control sensing electrodes in the first third touch control sensing electrode group (i.e., RX1 to RXa) may be $d_1 = \ldots = d_a$, the width of the touch control sensing electrodes in the second touch control sensing electrode group (i.e., RXa+1 to RXb) may be $d_{a+1} = \ldots = d_b$, and the width of the touch control sensing electrodes in the third touch control sensing electrode group (i.e., RXb+1 to RXn) may be $d_{b+1} = \ldots = d_n$, where $d_1 = \ldots = d_a > d_{a+1} = \ldots = d_b > d_{b+1} = \ldots = d_n$.

That is, from the third touch control sensing electrode group to the first touch control sensing electrode group, the distance between the touch control sensing electrode group and the first integrated circuit 305 may gradually increase, the area of the touch control sensing electrodes in the touch control sensing electrode groups may gradually increase, while the resistance of the touch control sensing electrodes in the touch control sensing electrode groups may gradually decrease.

That is, the touch control sensing electrodes in the third touch control sensing electrode group (i.e., RXb+1 to RXn) may have a smaller area and larger resistance than the touch control sensing electrodes in the second third touch control sensing electrode group (i.e., RXa+1 to RXb). The touch control sensing electrodes in the second third touch control sensing electrode group (i.e., RXa+1 to RXb) may have a smaller area and larger resistance than the touch control sensing electrodes in the first third touch control sensing electrode group (i.e., RX1 to RXa). Thus, the total resistance of each touch control sensing electrode 303 and the touch control sensing electrode signal line 304 electrically connected thereto may be the same within the permissible range of error. Accordingly, R1 and R2 may be configured to satisfy the condition of $-20\% \leq (R1-R2)/R2 \leq 20\%$.

In the disclosed touch control display panel 300, provided that the resistance of each touch control sensing signal line 304 is the same, through varying the area of the touch control sensing electrode 303 or the length in the direction D1 of the touch control sensing electrode 303, R1 and R2 may be configured to satisfy the condition of $-20\% \leq (R1-R2)/R2 \leq 20\%$, where R1 is a total resistance of the first touch control sensing electrode and the first touch control sensing signal line electrically connected to the first touch control sensing electrode, and R2 is a total resistance of the second touch control sensing electrode and the second touch control sensing signal line electrically connected to the second touch control sensing electrode.

In certain embodiments, for example, in the touch control display panel shown in FIG. 1A, FIG. 1B, and FIG. 2, through controlling the length and/or width of the touch control sensing signal line, the first touch control sensing signal line and the second touch control sensing signal line may be configured to have a same resistance. Thus, the resistance R1 and the resistance R2 may be configured to satisfy the condition of $-20\% \leq (R1-R2)/R2 \leq 20\%$.

In certain other embodiments, for example, in the touch control display panel shown in FIG. 3A and FIG. 3B, through controlling the area of the touch control sensing electrode or the length in the first direction D1 of the touch control sensing electrode, the first touch control sensing electrode and the second touch control sensing electrode may be configured to have a different resistance. Thus, the resistance R1 and the resistance R2 may be configured to satisfy the condition of $-20\% \leq (R1-R2)/R2 \leq 20\%$.

In certain other embodiments, through controlling the length and/or width of the touch control sensing signal line and, meanwhile, the area of the touch control sensing electrode or the length in the first direction D1 of the touch control sensing electrode, the resistance R1 and the resistance R2 may be configured to satisfy the condition of $-20\% \leq (R1-R2)/R2 \leq 20\%$. In the disclose embodiments, the uniformity of the touch control sensitivity across the touch control display panel may be improved.

Further, in the disclosed embodiments, the touch control sensing electrode may have a shape shown in FIG. 1A, FIG. 1B, FIG. 2, and FIG. 3A, in which the spacing between two adjacent touch control sensing electrodes may be a straight line. In certain embodiments, the touch control sensing electrode may have a shape different from a straight line. Certain examples are shown in FIG. 4A and FIG. 4B.

Figure 4A:
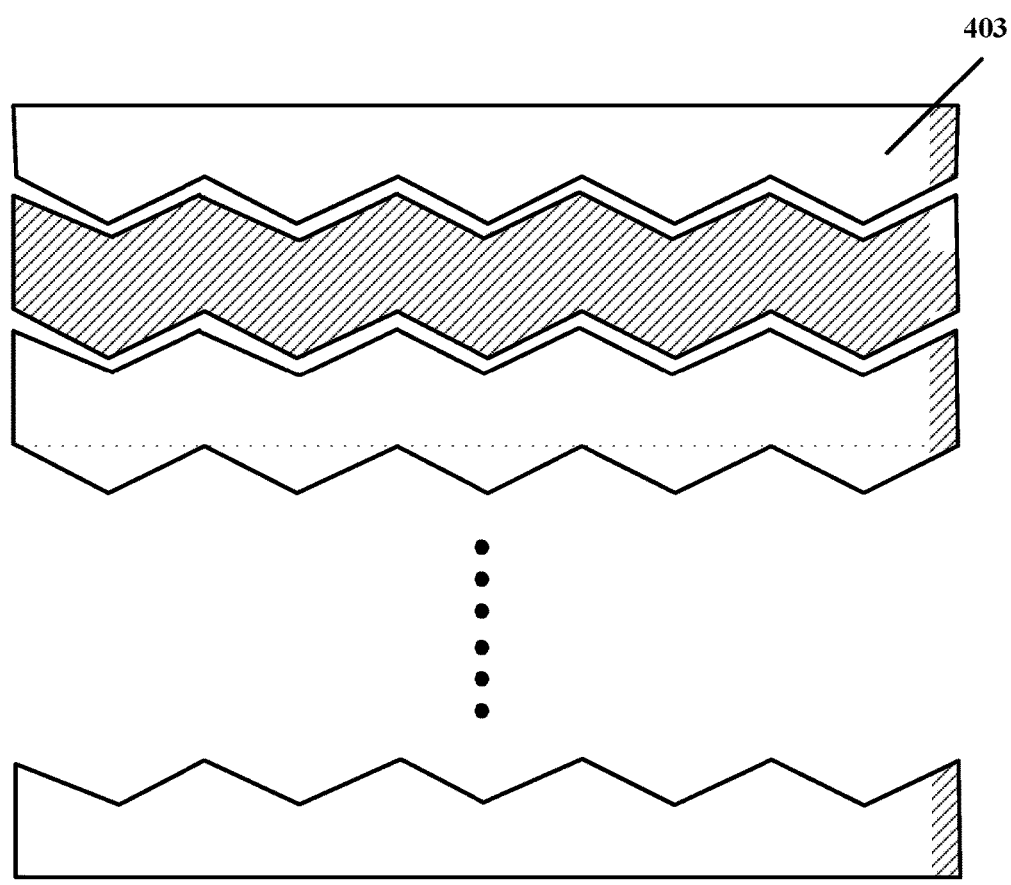
FIG. 4A illustrates a top view of exemplary touch control sensing electrodes consistent with disclosed embodiments.
Figure 4B:
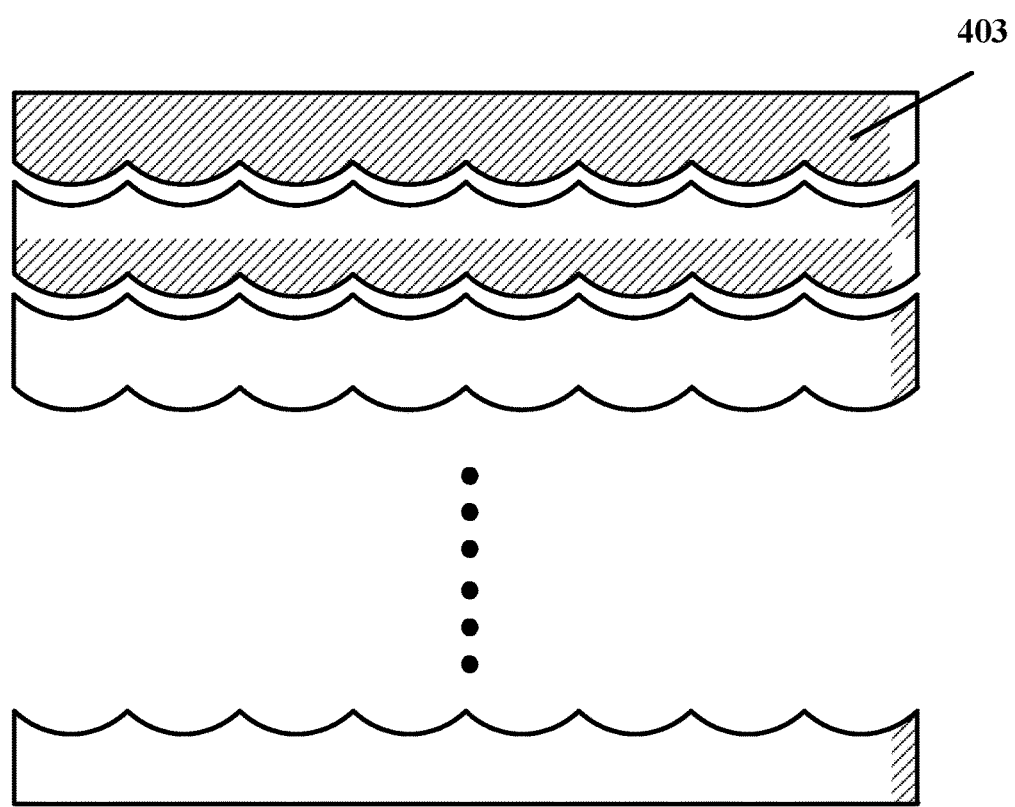
FIG. 4B illustrates a top view of other exemplary touch control sensing electrodes consistent with disclosed embodiments.

FIG. 4A illustrates a top view of exemplary touch control sensing electrodes consistent with disclosed embodiments. As shown in FIG. 4A, the spacing between two adjacent touch control sensing electrodes may be a fold line. FIG. 4B illustrates a top view of other exemplary touch control sensing electrodes consistent with disclosed embodiments. As shown in FIG. 4B, the spacing between two adjacent touch control sensing electrodes may be a curve. The shape of the touch control sensing electrodes may be determined according to various application scenarios, which is not limited by the present disclosure.

Figure 5A:
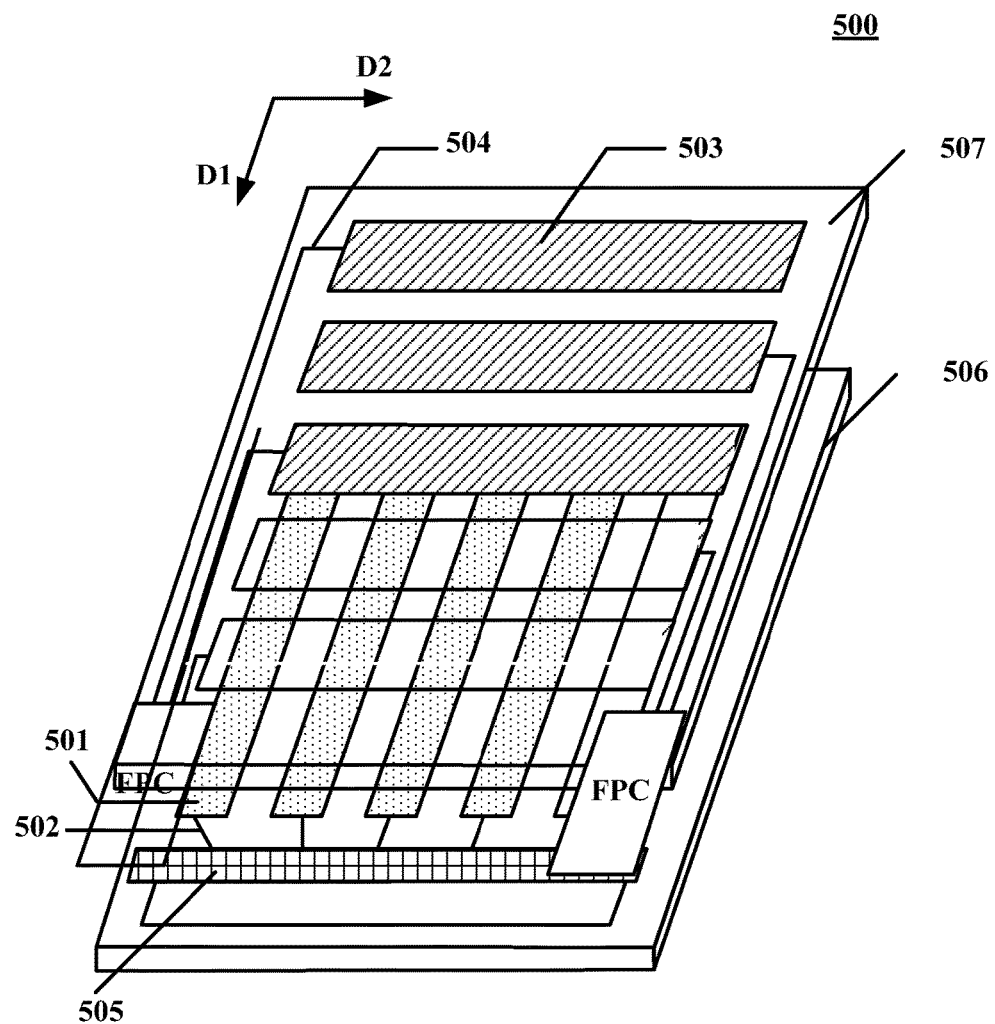
FIG. 5A illustrate an exemplary touch control display panel consistent with disclosed embodiments.

FIG. 5A illustrate an exemplary touch control display panel consistent with disclosed embodiments. As shown in FIG. 5A, the touch control display panel 500 may include a plurality of touch control driving electrodes 501, a plurality of touch control driving signal lines 502, a plurality of touch control sensing electrodes 503, a plurality of touch control sensing signal lines 504, a first integrated circuit 505, an array substrate 506, and a color film substrate 507. The first integrated circuit 505 may be any appropriate display controlling circuits and/or touch scanning circuits and/or touch sensing circuits of the touch control display panel.

The touch control driving electrodes 501 and the touch control driving signal lines 502 may be disposed on the array substrate 506, and the touch control sensing electrodes 503 and the touch control sensing signal lines 504 may be disposed on the color film substrate 507. It should be note that, the color film substrate 507 may include a surface facing the array substrate 506 (e.g., an inner surface) and a surface far away from the array substrate 506 (e.g., an outer surface). The touch control sensing electrodes 503 may be disposed on the surface of the color film substrate 507 far away from the array substrate 506, i.e., the outer surface of the color film substrate 507.

The first integrated circuit 505 may receive the touch sensing signals collected by the touch control sensing electrodes 503, and the touch sensing signals may be used to identify the touch position where a touch occurs. The first integrated circuit 505 may be electrically connected to each touch control driving electrode 501 through the corresponding touch control driving signal line 502. In a display stage, each touch control driving electrode 501 may be multiplexed as a common electrode, and the first integrated circuit 505 may provide a common voltage signal to each touch control driving electrode 501 through the touch control driving signal lines 502. The common voltage signal may work with the pixel voltage signal provided to the touch control display panel 500, such that the touch control display panel 500 may be able to display images.

In the touch stage, the first integrated circuit 505 may provide a touch driving signal to the touch control driving electrode 501 through the corresponding touch control driving signal line 502. The touch driving signal may enable the touch control sensing electrodes 503 and the touch control driving electrodes 501 to form a plurality of touch detection points, such that the touch control display panel 500 may be able to realize the touch control.

Figure 5B:
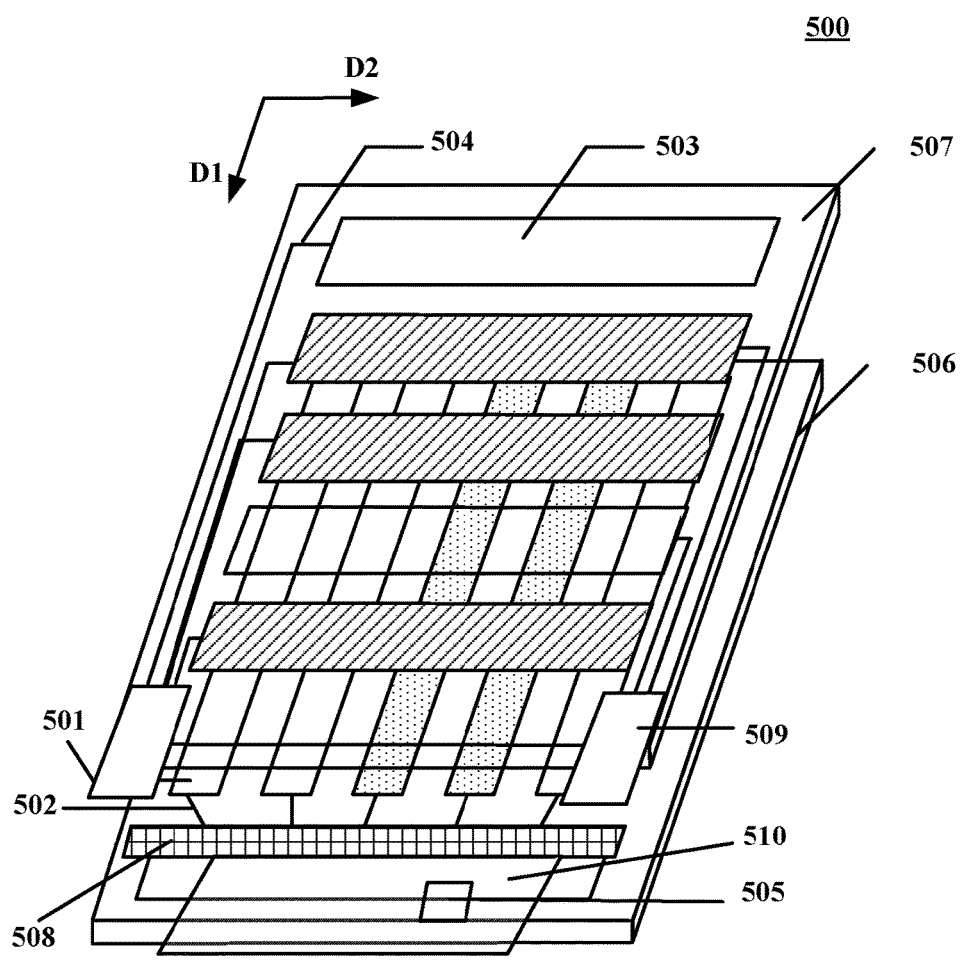
FIG. 5B illustrate another exemplary touch control display panel consistent with disclosed embodiments.

Further, the touch control display panel 500 may also include a second integrated circuit 508, and the corresponding structure is as shown in FIG. 5B. FIG. 5B illustrate another exemplary touch control display panel consistent with disclosed embodiments. As shown in FIG. 5B, the second integrated circuit 508 may be electrically connected to each touch control driving electrode 501 through the corresponding touch control driving signal line 502. The second integrated circuit 508 may be any appropriate display controlling circuits and/or touch scanning circuits and/or touch sensing circuits of the touch control display panel.

Moreover, in the display stage, each touch control driving electrode 501 may be multiplexed as a common electrode, and the second integrated circuit 508 may provide the common voltage signal to each touch control driving electrode 501 through the corresponding touch control driving signal line 502, such that the touch control display panel 500 may be able to display images. In the touch stage, the second integrated circuit 508 may provide the touch driving signal to the touch control driving electrode 501 through the corresponding touch control driving signal line 502, such that the touch control display panel 500 may be able to realize the touch control.

Further, in one embodiment, when the touch control display panel 500 includes both the first integrated circuit 505 and the second integrated circuit 508, the first integrated circuit 505 may be disposed on a first flexible printed circuit (FPC) 509, which may be connected to the color film substrate 507. Thus, the first integrated circuit 505 may be electrically connected to the second integrated circuit 508 through the first flexible printed circuit (FPC) 509.

In another embodiment, the first integrated circuit 505 may be disposed on a second flexible printed circuit (FPC) 510. The second flexible printed circuit (FPC) 510 may be respectively connected to first flexible printed circuit (FPC) 509 and the touch control sensing signal lines 504, such that the first integrated circuit 505 may be electrically connected to the second integrated circuit 508. The first integrated circuit 505 may be a touch control chip in the touch control display panel 500, and the second integrated circuit 508 may be a driving chip in the touch control display panel 500.

Figure 5C:
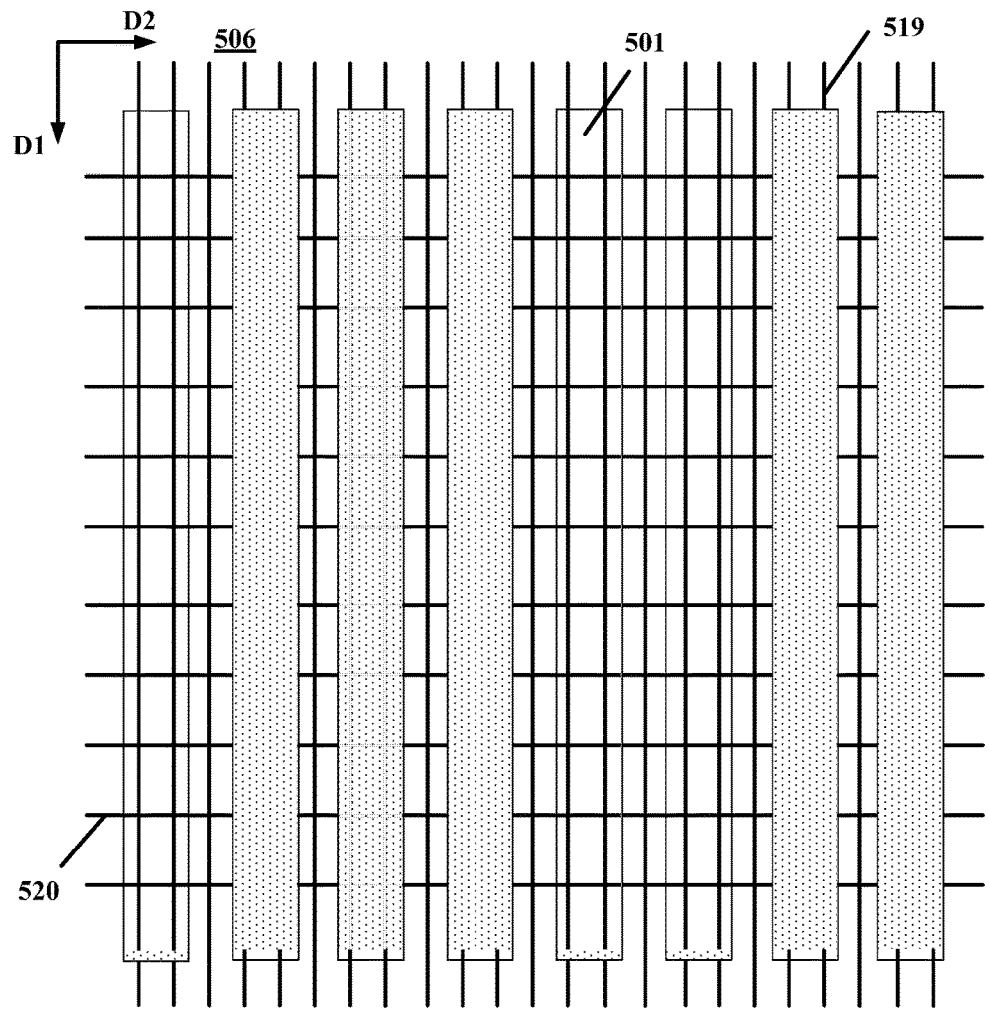
FIG. 5C illustrates a top view of an exemplary array substrate in an exemplary touch control display panel consistent with disclosed embodiments.

FIG. 5C illustrates a top view of an exemplary array substrate in an exemplary touch control display panel consistent with disclosed embodiments. As shown in FIG. 5C, the array substrate 506 may include a plurality of data lines 519 extending in the first direction D1 and arranged in the second direction D2, and a plurality of scanning lines 520 extending in the second direction D2 and arranged in the first direction D1. The touch control driving electrodes 501 may be arranged parallel to the data lines 519.

Although FIG. 5C illustrates the touch control driving electrodes 501, data lines 519, and scanning lines in the array substrate 506. Those skilled in the art should understand that, the disclosed touch control display panel may also include any appropriate components, such as a liquid crystal layer sandwiched between the array substrate 506 and the color film substrate 507, and spacers for supporting the liquid crystal layer, etc. The number of the data lines 519 and the number of the scanning lines 520 are for illustrative purposes and are not intended to limit the scope of the present disclosure.

Figure 6:
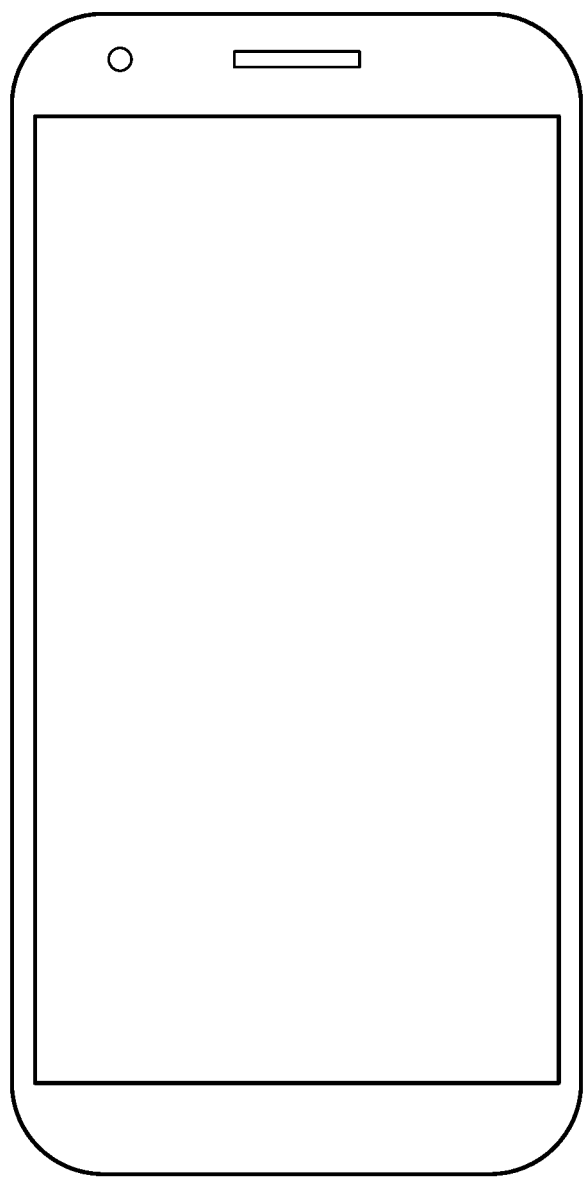
FIG. 6 illustrates an exemplary touch control display device consistent with disclosed embodiments.

The present disclosure also provides a touch control display device including any disclosed touch control display panel, and the corresponding structure is shown in FIG. 6. FIG. 6 illustrates an exemplary touch control display device consistent with disclosed embodiments. As shown in FIG. 6, the touch control display device 60 may be a smart phone, and the touch control display device 60 may comprise any of the disclosed touch control display panels, whose structure and functions are not repeated here. Those skilled in the art should understand that, the disclosed touch control display device is not limited to the smart phone shown in FIG. 11, and the disclosed touch control display device may be a tablet, a TV, and a smart wearable device, etc.

It should be noted that, the accompanying drawings show that the first direction may be a vertical direction, and the second direction may be a horizontal direction. The first direction may be perpendicular to the second direction. The first direction and the second direction in the accompanying drawings are for illustrative purposes and are not intended to limit the scope of the present disclosure. In certain embodiment, the first direction may be not perpendicular to the second direction.

Further, FIG. 5 illustrates that the touch control driving signal lines 502 may be disposed on the array substrate 506, and the touch control sensing electrodes 503 may be disposed on the surface of the color film substrate 507 far away from the array substrate 506, which are for illustrative purposes and are not intended to limit the scope of the present disclosure. In another embodiment, both the touch control driving signal lines 502 and the touch control sensing electrodes 503 may be disposed on the array substrate 506, or the color film substrate 507, or any other appropriate substrate.

The disclosed touch control display panels and touch control display device comprises a plurality of touch control driving electrodes, a plurality of touch control sensing electrodes, and a first integrated circuit. The touch control driving electrodes includes a plurality of first touch control sensing electrodes and a plurality of second touch control sensing electrodes. A distance between the first touch control sensing electrode and the first integrated circuit is longer than a distance between the second touch control sensing electrode and the first integrated circuit.

A total resistance of the first touch control sensing electrode and the first touch control sensing signal line electrically connected to the first touch control sensing electrode is R1, and a total resistance of the second touch control sensing electrode and the second touch control sensing signal line electrically connected to the second touch control sensing electrode is R2, wherein the resistance R1 and the resistance R2 satisfy −20%≤(R1−R2)/R2≤20%. Thus, a total resistance of each touch control sensing electrode and the electrically connected touch control sensing signal line is equal or substantially equal, the uniformity of the touch control sensitivity across the touch control display panel is improved.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A touch control display panel, comprising:
   a plurality of touch control driving electrodes extending in a first direction and arranged in a second direction intersecting the first direction;
   a plurality of touch control sensing electrodes extending in the second direction and arranged in the first direction, and including a plurality of first touch control sensing electrodes and a plurality of second touch control sensing electrodes;
   a plurality of touch control sensing signal lines including a plurality of first touch control sensing signal lines and a plurality of second touch control sensing signal lines; and
   a first integrated circuit controlling the touch control display panel,
   wherein a first touch control sensing electrode is electrically connected to the first integrated circuit through at least one first touch control sensing signal line, and a second touch control sensing electrode is electrically connected to the first integrated circuit through at least one second touch control sensing signal line,
   a distance between the first touch control sensing electrode and the first integrated circuit is longer than a distance between the second touch control sensing electrode and the first integrated circuit, and
   R1 and R2 satisfy a predetermined relationship such that touch control sensing signals respectively outputted by the at least one first touch control sensing signal line and the at least one second touch control sensing signal line exhibit substantially same signal delay time, where R1 is a total resistance of the first touch control sensing electrode and the at least one first touch control sensing signal line electrically connected to the first touch control sensing electrode, and R2 is a total resistance of the second touch control sensing electrode and the at least one second touch control sensing signal line electrically connected to the second touch control sensing electrode,
   wherein the total resistance R1 and the total resistance R2 satisfy the predetermined relationship of −20%≤(R1−R2)/R2≤20%, and
   the first touch control sensing electrode have a resistance equal to or smaller than the second touch control sensing electrode.

2. The touch control display panel according to claim 1, wherein:
   the total resistance R1 is equal to the total resistance R2.

3. The touch control display panel according to claim 1, further including:
   an insulating layer disposed between the touch control sensing electrodes and the touch control sensing signal lines,
   wherein the insulating layer is disposed with a plurality of through-holes,
   the first touch control sensing electrode is electrically connected to the at least one first touch control sensing signal line via a first through-hole of the plurality of through-holes, and the second touch control sensing electrode is electrically connected to the at least one second touch control sensing signal line via a second through-hole of the plurality of through-holes.

4. The touch control display panel according to claim 1, wherein:
the at least one first touch control sensing signal line has an equal length as the at least one second touch control sensing signal line.

5. The touch control display panel according to claim 3, wherein:
the at least one first touch control sensing signal line has a first portion in the first direction, and a second portion in the second direction;
the at least one second touch control sensing signal line has a first portion in the first direction, and a second portion in the second direction;
the first portion of the at least one first touch control sensing signal line is longer than the first portion of the at least one second touch control sensing signal line; and
the second portion of the at least one first touch control sensing signal line is shorter than the second portion of the at least one second touch control sensing signal line.

6. The touch control display panel according to claim 5, wherein:
a projection of the at least one first touch control sensing signal line onto the touch control sensing electrode is a straight line, a fold line, or a curve; and
a projection of the at least one second touch control sensing signal line onto the touch control sensing electrode is a straight line, a fold line, or a curve.

7. The touch control display panel according to claim 1, wherein:
the at least one first touch control sensing signal line is longer than the at least one second touch control sensing signal line.

8. The touch control display panel according to claim 7, wherein:
the at least one first touch control sensing signal line has a larger width than the at least one second touch control sensing signal line.

9. The touch control display panel according to claim 1, wherein:
the first direction and the second direction form a plane; and
an orthogonal projection of the first touch control sensing electrode onto the plane has a larger area than an orthogonal projection of the second touch control sensing electrode onto the plane.

10. The touch control display panel according to claim 9, wherein:
in the first direction, the first touch control sensing electrode is longer than the second touch control sensing electrode.

11. The touch control display panel according to claim 1, wherein:
a spacing between two adjacent touch control sensing electrodes is a straight line, a fold line, or a curve.

12. The touch control display panel according to claim 1, further including:
an array substrate;
a color film substrate;
a plurality of data lines extending in the first direction and arranged in the second direction; and
a plurality of scanning lines extending in the second direction and arranged in the first direction,
wherein the array substrate includes the plurality of touch control driving electrodes,
the color film substrate includes the plurality of touch control sensing electrodes,
the touch control sensing electrodes are disposed on a surface of the color film substrate far away from the array substrate, and
the touch control driving electrodes are arranged parallel to the data lines.

13. The touch control display panel according to claim 12, wherein:
the first integrated circuit receives a touch sensing signal collected by a touch control sensing electrode.

14. The touch control display panel according to claim 13, wherein:
each touch control driving electrode is electrically connected to the first integrated circuit through a corresponding touch control driving signal line.

15. The touch control display panel according to claim 14, wherein:
each touch control driving electrode is multiplexed as a common electrode in a display stage;
the first integrated circuit provides a common voltage signal to a touch control driving electrode in the display stage; and
the first integrated circuit provides a touch driving signal to the touch control driving electrode in a touch stage.

16. The touch control display panel according to claim 13, further including:
a second integrated circuit controlling the touch control display panel,
wherein the second integrated circuit is electrically connected to each touch control driving electrode through a corresponding touch control driving signal lines;
each touch control driving electrode is multiplexed as a common electrode in a display stage;
the second integrated circuit provides a common voltage signal to a touch control driving electrode in the display stage; and
the second integrated circuit provides a touch driving signal to the touch control driving electrode in a touch stage.

17. A touch control display device comprising a touch control display panel, wherein the touch control display panel comprises:
a plurality of touch control driving electrodes extending in a first direction and arranged in a second direction intersecting the first direction;
a plurality of touch control sensing electrodes extending in the second direction and arranged in the first direction, and including a plurality of first touch control sensing electrodes and a plurality of second touch control sensing electrodes;
a plurality of touch control sensing signal lines including a plurality of first touch control sensing signal lines and a plurality of second touch control sensing signal lines; and
a first integrated circuit controlling the touch control display panel,
wherein a first touch control sensing electrode is electrically connected to the first integrated circuit through at least one first touch control sensing signal line, and a second touch control sensing electrode is electrically connected to the first integrated circuit through at least one second touch control sensing signal line,
a distance between the first touch control sensing electrode and the first integrated circuit is longer than a distance between the second touch control sensing electrode and the first integrated circuit, and R1 and R2 satisfy a predetermined relationship, such that touch control sensing signals respectively outputted by the at least one first touch control sensing signal line and the at least one second touch control sensing signal line exhibit substantially same signal delay time, where R1 is a total resistance of the first touch control sensing electrode and the at least one first touch control sensing signal line electrically connected to the first touch control sensing electrode, and R2 is a total resistance of the second touch control sensing electrode and the at least one second touch control sensing signal line electrically connected to the second touch control sensing electrode, wherein the total resistance R1 and the total resistance R2 satisfy the predetermined relationship of $-20\% \leq (R1-R2)/R2 \leq 20\%$, and the first touch control sensing electrode have a resistance equal to or smaller than the second touch control sensing electrode.

18. The touch control display device according to claim 17, wherein:

the total resistance R1 is equal to the total resistance R2.

19. A touch control display panel, comprising:

a plurality of touch control driving electrodes extending in a first direction and arranged in a second direction intersecting the first direction;

a plurality of touch control sensing electrodes extending in the second direction and arranged in the first direction, and including a plurality of first touch control sensing electrodes and a plurality of second touch control sensing electrodes;

a plurality of touch control sensing signal lines including a plurality of first touch control sensing signal lines and a plurality of second touch control sensing signal lines; and a first integrated circuit controlling the touch control display panel, wherein a first touch control sensing electrode is electrically connected to the first integrated circuit through at least one first touch control sensing signal line, and a second touch control sensing electrode is electrically connected to the first integrated circuit through at least one second touch control sensing signal line, a distance between the first touch control sensing electrode and the first integrated circuit is longer than a distance between the second touch control sensing electrode and the first integrated circuit, and R1 and R2 satisfy a predetermined relationship such that touch control sensing signals respectively outputted by the at least one first touch control sensing signal line and the at least one second touch control sensing signal line exhibit substantially same signal delay time, where R1 is a total resistance of the first touch control sensing electrode and the at least one first touch control sensing signal line electrically connected to the first touch control sensing electrode, and R2 is a total resistance of the second touch control sensing electrode and the at least one second touch control sensing signal line electrically connected to the second touch control sensing electrode, wherein the total resistance R1 and the total resistance R2 satisfy the predetermined relationship of $-20\% \leq (R1-R2)/R2 \leq 20\%$, and the first touch control sensing electrode have a resistance smaller than the second touch control sensing electrode.

* * * * *